Feb. 26, 1929. 1,703,605
R. D. BALLANTYNE
PIPE SUPPORT
Filed June 6, 1927
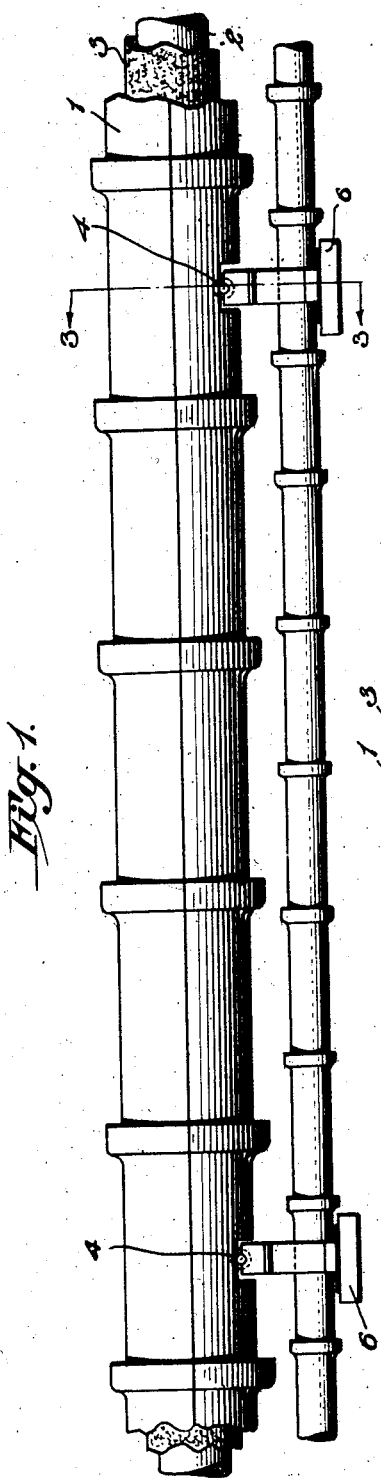
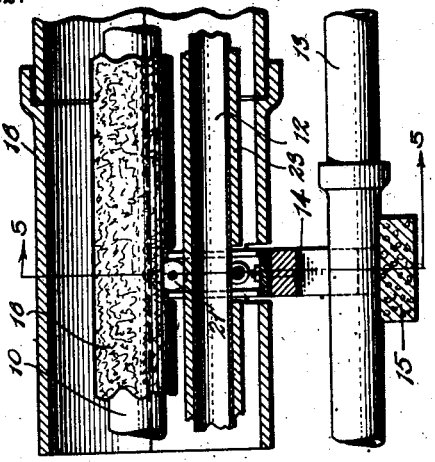
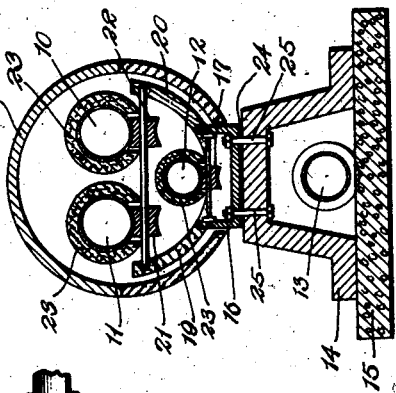
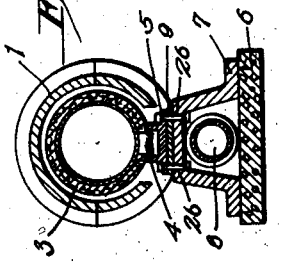
INVENTOR.
R. D. Ballantyne,
BY
ATTORNEYS Patented Feb. 26, 1929.

1,703,605

UNITED STATES PATENT OFFICE.

ROBERT D. BALLANTYNE, OF ATLANTA, GEORGIA.

PIPE SUPPORT.

Application filed June 6, 1927. Serial No. 196,801.

One of the main objects of this invention is to provide a pipe support which may be used in connection with an underground steam system or any other suitable apparatus.

Among the objects of this invention is an improvement in the means for allowing for expansion and contraction of the pipe line due to the varying degrees of heat and temperature to which the pipes may be submitted, and at the same time, provide a means for raising and lowering the height of the pipe supports which carry the means for allowing the expansion and contraction.

A further object of this invention is to provide a pipe support adapted for service in a plural pipe system in which the plural pipe system could be changed to a single system by merely changing the support without disturbing the lower section of the conduit through which the pipes extend.

Other objects of this invention will appear from the following detailed description of the device and as disclosed in the single sheet of drawings which is herewith made a part of this application.

In the drawings—

Figure 1 illustrates a side elevational view of a conduit for a pipe line system disclosing the supporting means for allowing for expansion and contraction of the pipe within the conduit.

Figure 2 represents a sectional longitudinal view of a pipe line system disclosing the roller support in operative relationship with the pipe.

Figure 3 illustrates a sectional view of Figure 1 taken along line 3—3.

Figure 4 represents a sectional longitudinal view of a modification of this invention disclosing a plural pipe line system and the relationship of the roller supports to the pipe lines.

Figure 5 represents a sectional view of Figure 4 taken along lines 5—5.

Numeral 1 designates a conduit of the ordinary type comprising split, double strength vitrified clay tile, adapted to slidably receive therein a pipe line system 2 constructed of suitable material, commonly used in steam, water or oil pipe systems having a pipe line covering 3. A pipe line system 2 is adapted to be supported in such a manner that an allowance for expansion and contraction may be obtained through the medium of cast iron rollers 4, or rollers made of any other suitable material, rotatably mounted in a bearing 5 made of some proper material such as cast iron. In order to provide a firm support for the pipe rollers 4 it is preferred to construct a firm concrete foundation 6 upon which is adapted to rest a standard 7 ordinarily made of cast iron and formed to allow the extension of a vitrified clay tile under-drain pipe line 8 between its side extensions. It is required from time to time to raise or lower the roller support and in order to accomplish this purpose shims 9 of varying thicknesses may be used, thereby providing an adjustable pipe support for an underground conduit system which will not only allow for the longitudinal expansion and contraction of the pipe, but also for the vertical adjustment such as the raising and lowering of the rollers 4. Figures 4 and 5 represent a modification of this invention disclosing a plural pipe line system having three lines 10, 11 and 12, and an under-drain line 13 located in the usual position between the said elements of a supporting standard 14 which is in turn carried by a concrete foundation 15, these elements being similar to those required for a single pipe line system except that they are of the required additional strength. The standard 14 is adapted to support a roller bearing 16 made of suitable material for rotatably mounting therein a roller element 17.

The pipe line systems 10, 11 and 12 are slidably mounted within a conduit 18 upon a pipe support bracket constructed having a base portion 16 and upwardly and outwardly extending arm portions 19 and 20, the pipe line 12 being slidably supported on the roller mounted in the portion 16 of the support, while pipe line systems 10 and 11 are slidably mounted on rollers 21 and 22 rotatably mounted in the upwardly and outwardly extending arm portions 19 and 20, the pipe systems being provided with the usual pipe covering 23. In order to allow for the raising and lowering of the roller elements 17, 21 and 22, various thicknesses of shims 24 are provided. The shims may be made of any suitable material such as mild steel. The roller supporting elements 16, 19 and 20 are firmly connected to the standard 14 by means of bolts 25.

The roller support 5 in Figure 3 is adapted to be firmly connected with the standard element 7 by means of bolts 26 or any other suitable manner.

In operation, this invention provides a pipe support of simple and inexpensive construction which will function to allow for the longitudinal expansion and contraction of either single or plural pipe line systems, at the same time providing a novel means of lowering or raising the height of the roller supports as may be desired, consisting of the use of shims having various thicknesses.

The invention, as set forth, applies to single or plural pipe line systems, providing in every instance an efficient pipe support bracket having many advantages over supporting brackets in ordinary use. In the case of the plural pipe line system, the supporting bracket, as herewith specified and claimed, has many advantages, in that the system could be changed to a single pipe system by means of merely altering the bracket without disturbing the lower section of the conduit. Obviously, the roller supports may be attached to or detached from the standards very easily owing to the fact that they are connected together merely by means of bolts or cap screws as may be desired. The use of shims having different thicknesses are of equal service to single or multiple line systems. In the case of plural pipe line systems, as disclosed in Figures 4 and 5, the shim 24 will act to adjust for height of each of the pipe line systems, at the same time, within the conduit.

It is to be understood that alterations and substitutions may be made in the disclosure of the drawings and specification within the scope of the appended claims without affecting the merits of this invention.

What I claim is:—

1. In an adjustable pipe support for under-ground conduits having pipe lines slidably positioned within the conduits, means for allowing for expansion and contraction of the pipe lines comprising suitably mounted rollers upon which the pipes are supported, an adjustable bracket for rotatably supporting the rollers, a standard for receiving the bracket, the bracket comprising a main portion for attachment to the standard, and upwardly and outwardly extending circular-shaped arm portions for rotatably supporting roller elements.

2. In an adjustable pipe support for under-ground conduits having pipe lines slidably positioned within the conduits, means for allowing for expansion and contraction of the pipe lines comprising suitably mounted rollers upon which the pipes are supported, an adjustable bracket for rotatably supporting the rollers, a standard for receiving the bracket, the bracket comprising a main portion for attachment to the standard, and upwardly and outwardly extending circular-shaped arm portions for rotatably supporting roller elements, the main body portion of the bracket being adapted to rotatably support one of the roller elements.

3. In an adjustable pipe support for underground conduits having pipe lines slidably positioned within the conduits, means for allowing for expansion and contraction of the pipe lines comprising suitably mounted rollers upon which the pipes are supported, a bracket for rotatably supporting the rollers, a standard for receiving the brackets, comprising an inverted trough-shaped member for receiving a conduit, having upwardly and inwardly inclined side portions, and a top flat portion for receiving the bracket, fastening means extending through the bracket and top flat portions for firmly holding the standard and bracket together.

4. In an underground conduit system in which one or more continuous pipes are supported within a protective conduit, means for effectively supporting said pipes independently of the protective conduit comprising spaced blocks and U shaped members inverted with the ends of their legs abutting the top face of said blocks, and means secured to the tops of said U shaped members adapted to pass freely through suitable apertures in the bottom of the protective conduit to support said pipes.

5. In an underground conduit system in which one or more continuous pipes are supported within a protective conduit, means for supporting said pipes independently of the protective conduit comprising U shaped members, and means fastened to said U shaped members for supporting said continuous pipes.

6. In an underground conduit system, a base, a drain pipe thereon, a standard resting on said base and straddling said pipe, a protective casing suitably supported above said standard and having an aperture through the wall thereof, and means supported by said standard and extending through said aperture to support piping in said casing.

7. In an underground conduit system, a base, a drain pipe thereon, a protective casing suitably supported above said base and having an aperture through the wall thereof, and means straddling said pipe and seated on said base and having a part extending through said aperture to support piping within said casing independently of said drain pipe.

In testimony whereof I affix my signature.

ROBERT D. BALLANTYNE.